US006438817B1

(12) United States Patent
Pongratz

(10) Patent No.: US 6,438,817 B1
(45) Date of Patent: Aug. 27, 2002

(54) COVER INSTALLATION TOOL

(76) Inventor: Andrew L. Pongratz, 816 Circuit St., Hanover, MA (US) 02339

( * ) Notice: Subject to any disclaimer, the term of this patent is extended or adjusted under 35 U.S.C. 154(b) by 0 days.

(21) Appl. No.: 09/431,867

(22) Filed: Nov. 2, 1999

Related U.S. Application Data

(60) Provisional application No. 60/110,589, filed on Dec. 2, 1998.

(51) Int. Cl.[7] .......... B23P 19/04

(52) U.S. Cl. .......... 29/453; 29/243.56; 29/268; 81/426

(58) Field of Search .......... 29/268, 243.56, 29/453; 81/419, 420, 426

(56) References Cited

U.S. PATENT DOCUMENTS 974,368 A * 11/1910 Eaton
1,513,356 A * 10/1924 Watson
2,755,541 A * 7/1956 Kruger
3,022,510 A * 2/1962 O'Malley
3,517,874 A * 6/1970 Cressy
3,571,894 A * 3/1971 Bieka .......... 29/268
3,918,140 A 11/1975 Konstant .......... 29/271
4,075,749 A * 2/1978 Hubeny
4,096,618 A 6/1978 Perline et al. .......... 29/278
4,694,550 A * 9/1987 Grove
4,869,464 A * 9/1989 Davidson
4,881,434 A * 11/1989 Keller
4,953,903 A 9/1990 Warner .......... 294/1.1
5,150,505 A 9/1992 Drabek .......... 29/278
5,182,829 A 2/1993 Sears .......... 7/166

* cited by examiner

*Primary Examiner*—S. Thomas Hughes
*Assistant Examiner*—Steven Blount
(74) *Attorney, Agent, or Firm*—Weingarten, Schurgin, Gagnebin & Lebovici LLP

(57) ABSTRACT

A hand operated tool which aids in securing a cover to a vehicle or other object is presented. The cover installation tool of the present invention includes at one end handles comprising a pair of opposing members disposed at an angle with respect to each other and hinged where the opposing members intersect. The handles may have an ergonomic shape such that the tool is easy to grasp and operate. Additionally, the handles may include a rubber or plastic coating to provide a secure gripping surface and comfort to the user. At an opposite end of the tool, a pair of opposing jaws are configured to fit around a snap head and to engage the material. As such, the cover can be installed without applying lateral forces to the snap head and damaging the material adjacent the snap head.

13 Claims, 3 Drawing Sheets

COVER INSTALLATION TOOL

CROSS REFERENCE TO RELATED APPLICATIONS

This application claims priority under 35 U.S.C. §119(e) to U.S. Provisional Patent Application No. 60/110,589 filed Dec. 2, 1998, the disclosure of which is incorporated herein by reference.

STATEMENT REGARDING FEDERALLY SPONSORED RESEARCH OR DEVELOPMENT

Not Applicable

BACKGROUND OF THE INVENTION

Canvas or vinyl covers are typically used on recreational vehicles such as boats, jeeps, and the like. The cover is normally held in place on the vehicle by a plurality of fasteners such as snaps. A problem associated with these types of covers is the difficulty encountered when attempting to mate the snap heads on the cover with their corresponding snap posts located on the recreational vehicle or other target surface. The installation becomes even more difficult when the cover has been exposed to rain or sunlight, wherein the cover shrinks or becomes otherwise distorted.

Several tools have been developed to aid in the installation of the cover to the recreational vehicle. While such tools may aid in securing the cover to the vehicle, a problem associated with these prior tools is that they grasp the snap head disposed in the cover and apply a pulling force to the snap head, which places a large strain on the cover material immediately surrounding the snap head. As a result, the cover material is prone to rip or split around the snap head.

BRIEF SUMMARY OF THE INVENTION

A hand operated tool which aids in securing a cover to a vehicle or other object is presented. The cover installation tool of the present invention includes at one end handles comprising a pair of opposing members disposed at an angle with respect to each other and hinged where the opposing members cross one another. The handles may have an ergonomic shape such that the tool is easy to grasp and operate. Additionally, the handles may include a rubber or plastic coating to provide a secure gripping surface and comfort to the user. At an opposite end of the tool, a pair of opposing jaws is configured to engage the cover material around a snap head. A snap head engaging member or socket projects from one of the jaws and enables, the snap head to be pressed onto a corresponding snap post. The cover can be seized and pulled such that the snap head is located in position over a corresponding snap post without straining the snap head or damaging the cover material adjacent the snap head.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 2:
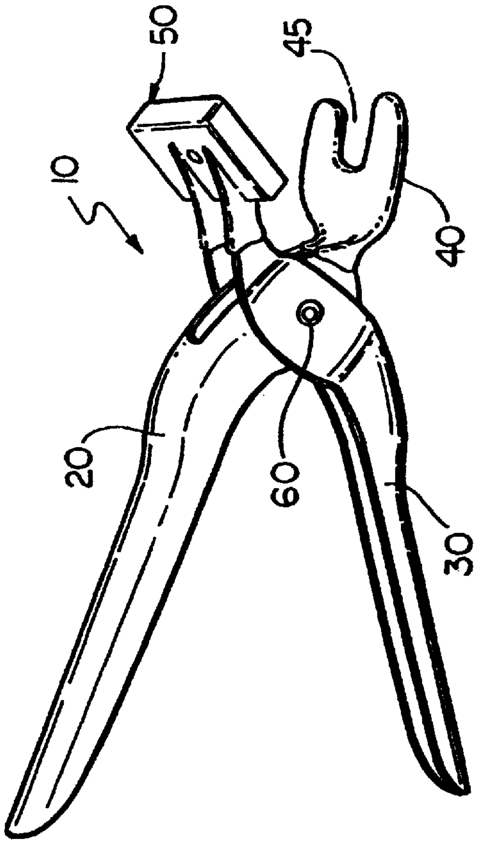
FIG. 2 is an opposite side view of the tool of FIG. 1.
Figure 3:
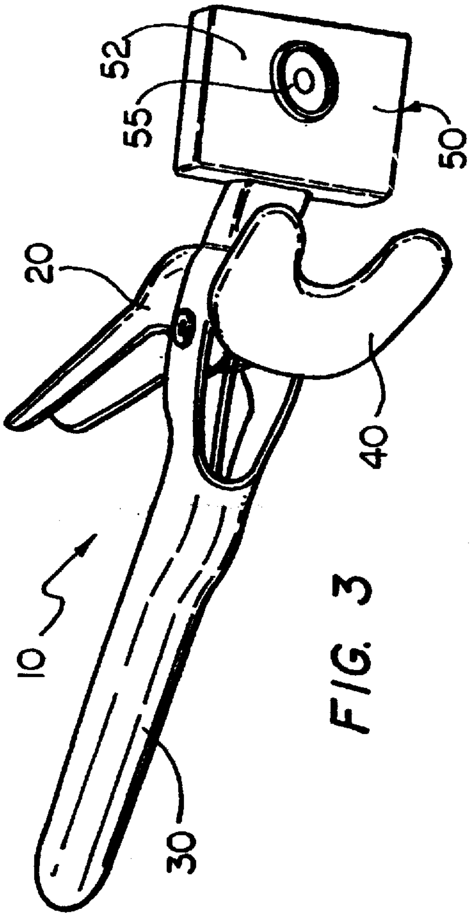
FIG. 3 a view of the jaws of the tool-of FIG. 1.
Figure 1:
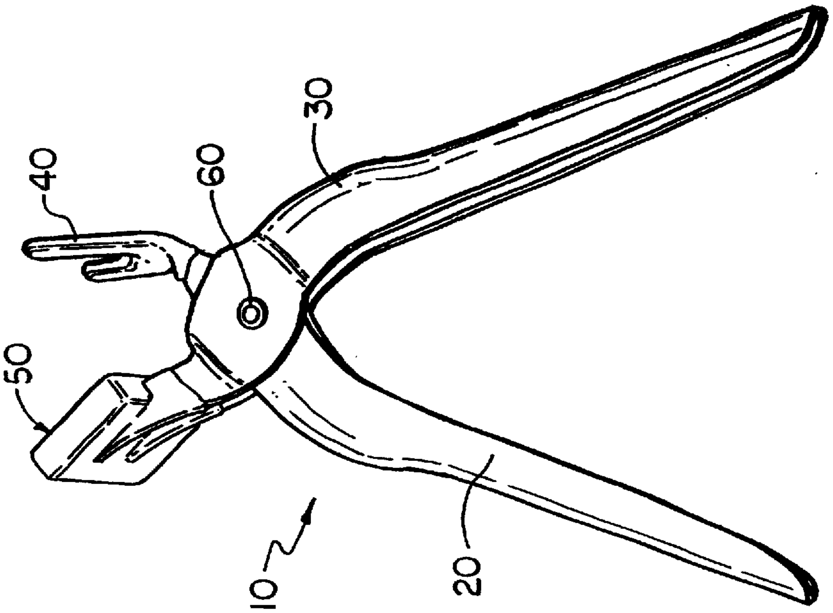
FIG. 1 is a first side view of the tool of the present invention.

A cover installation tool which aids in securing a cover to a vehicle or other object is presented. Referring to FIGS. 1–3, a first embodiment of the cover installation tool 10 is shown. The tool 10 includes a first handle 20, a second handle 30, a first jaw 40, a second jaw 50 and a pivot element 60.

Figure 4:
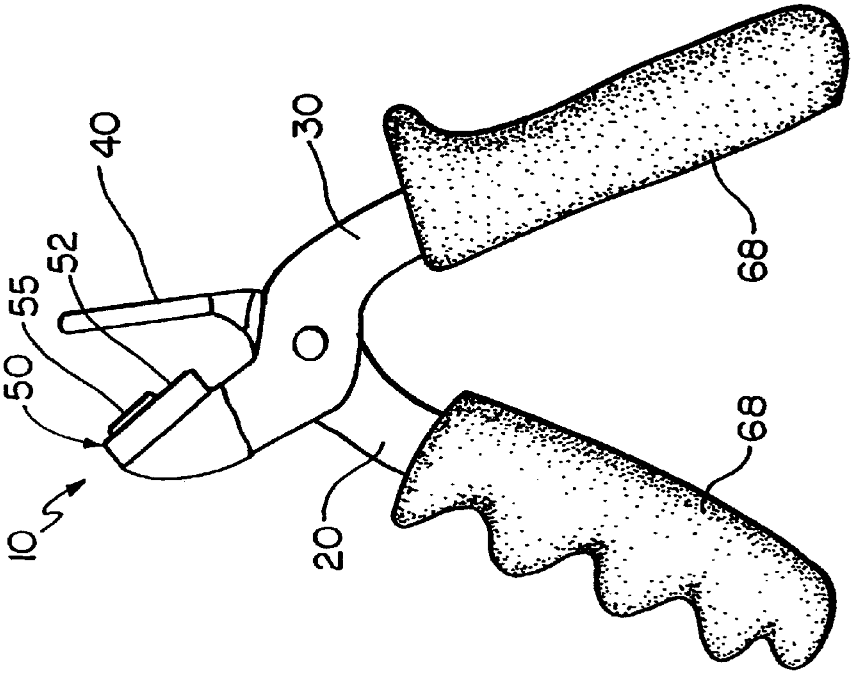
FIG. 4 is a view of the tool including ergonomic handles.

The first and second handles 20 and 30 comprise a pair of opposing members disposed at an angle with respect to each other and which cross one another. A pivot element 60 is disposed within the first handle 20 and second handle 30 where the handles cross one another and allow the handles to pivot about a pivot axis defined by the pivot element. A biasing element such as a spring is disposed between the handle members 20 and 30 and biases the handle members into a normally open position with respect to each other, in one embodiment. An operator using the tool 10 can easily overcome the spring bias. The handles 20 and 30 may have an ergonomic shape such that the tool is easy to grasp and operate. Additionally, the handles 20 and 30 may be rubber or plastic coated 68 to provide a secure gripping surface and comfort to the user, as shown in FIG. 4.

Each handle member 20 and 30 has a respective jaw disposed at a distal end thereof. First handle member 20 includes a first jaw 40 which is generally U-shaped. First jaw 40 is configured to fit around the bottom of a snap head, or fastener element, disposed in a cover. The opening 45 within the U-shaped jaw 40 is larger than the diameter of the snap he ad such that direct contact between the first jaw 40 and the snap head of the cover is substantially avoided.

Second handle member 30 includes a second jaw 50 which has a contact block 52 with a concave snap head engaging member 55, also referred to as a socket, disposed therein and extending below the plane of the contact block 52 in the direction of the opposing jaw 40. The snap engaging member 55 may be riveted or otherwise fastened to the handle-member 30. The snap head engaging member may be formed of stamped metal and is preferably provided with a resilient coating such as rubber to avoid damaging a snap head disposed therein. The second jaw 50 thus enables the cover material about a snap head to be engaged between the contact block 52 and the first jaw 40. Pulling forces are thereby transferred from the tool 10 to the cover, not to the snap head. Rather, the snap head is displaced below the plane of the cover by the snap head engaging member and through the U-shaped first jaw 40. By applying force on the second jaw opposite the snap head engaging member 55, the snap head may be urged onto a corresponding snap post. However, because the cover is engaged between the first jaw 40 and the contact block 52 of the second jaw 50, no lateral forces are applied to the snap head as the cover is manipulated.

Figure 5:
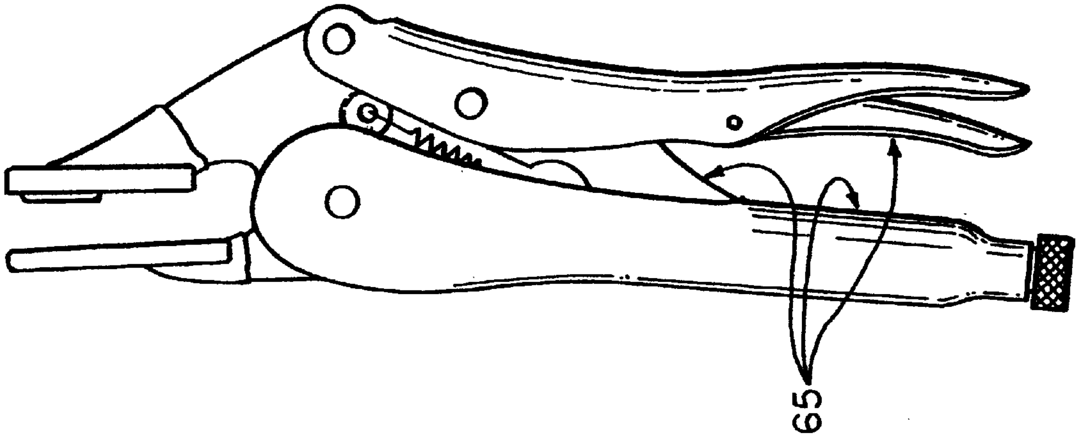
FIG. 5 is a view of the tool including a locking mechanism.

The jaws 40 and 50 may be attached to the handles by any means known in the art or may be formed integrally with the handles 20 and 30. The jaws 40 and 50 are preferably disposed at an angle with respect to the handles 20 and 30, as shown for instance in FIG. 1. This facilitates the location of a snap head over a snap post at an angle preferred for engagement therebetween. In an embodiment in which each jaw is angled with respect to the respective handle, the jaws are oriented such that the facing surfaces of the two jaws are substantially parallel when drawn together about the cover. In an alternative embodiment, such as shown in FIG. 5, the jaws 40, 50 are not angled with respect to the handles 20, 30. The surfaces of both jaws 40 and 50 are preferably coated with a resilient material in order to enhance the ability of the tool 10 to grip the cover material and to avoid any sharp edges which would pose the risk of tearing or puncturing the cover.

Figure 6:
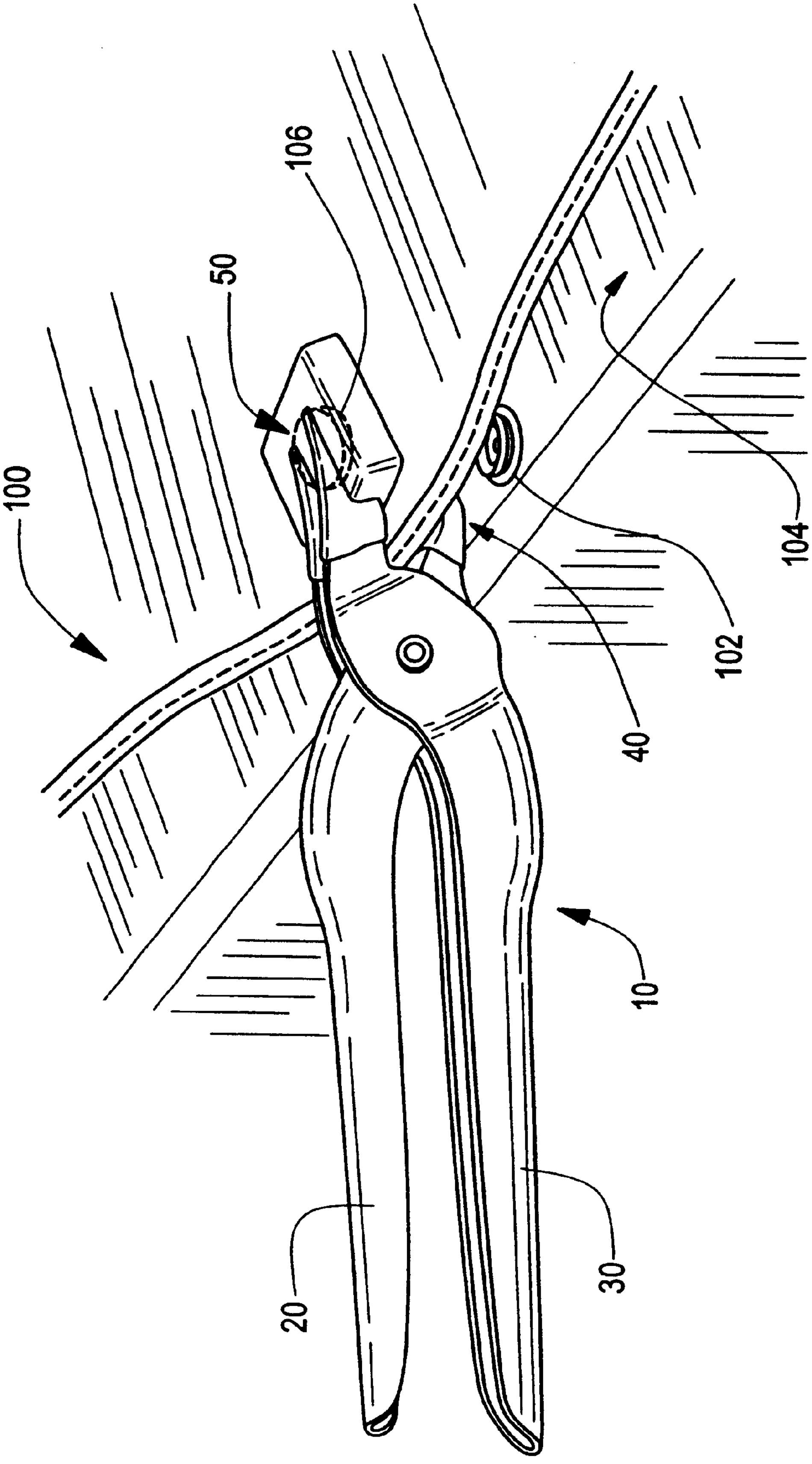
FIG. 6 illustrates the use of the tool of FIG. 1 in installing a snap head in a cover onto a snap post disposed on a mounting surface.

In use, as illustrated in FIG. 6, an operator positions the tool 10 such that the U-shaped jaw 40 is on the bottom side of the cover 100, surrounding a lower portion of a snap head 106 (visible in phantom through the second jaw 50) disposed through the cover 100. The second jaw 50 is brought towards the first jaw 40 by squeezing the handles 20 and 30 toward each other. The cover 100 is thus secured by the tool 10 between the opposing jaws 40 and 50 along the material portion only; in use, no lateral forces are applied to the snap head by the tool 10. The snap head of the cover 100 is then positioned over the corresponding snap post 102 on the vehicle or other surface 104, and can be readily engaged. Once engaged, the tool 10 is extracted by separating the opposing jaws 40 and 50 and withdrawing the tool 10 from the cover 100. Accordingly, the cover can be attached to the vihicle without damaging the cover, even if the cover has shrunk or become otherwise distorted.

A further embodiment is shown in FIG. 5. In this embodiment the handles include a locking mechanism (similar to a vice-grip) 65. In this embodiment, once a portion of the cover is secured between the opposing jaws, the handles are locked into position. Once the snap head of the cover is mated with a corresponding snap post on the vehicle, the handles are unlocked from the locked position and the tool removed as described above. The locking mechanism can be adjusted to grasp covers of different thicknesses.

The above-described tool provides an easy and convenient way to grasp a portion of a cover and install the cover on a vehicle or other target surface. By use of the specially configured jaws, the cover is, grasped and manipulated into a desired position by the material portion only. Accordingly, lateral forces used in positioning and aligning the cover are applied directly to the cover material while the junction of the cover and fastener is not strained. The life of the cover is thus extended.

Having described preferred embodiments of the present invention it should be apparent to those of ordinary skill in the art that other embodiments and variations of the presently disclosed embodiment incorporating these concepts may be implemented without departing from the inventive concepts herein disclosed. Accordingly, the invention should not be viewed as limited to the described embodiments but rather should be limited solely by the scope and spirit of the appended claims.

I claim:

1. An installation tool for a cover having fastener elements disposed therein, comprising:

- a first handle member having a first end and a second end;
- a second handle member having a first end and a second end, said second handle member disposed at an angle with respect to said first handle member;
- a pivot element interconnecting said first handle member and said second handle member, said pivot element intermediate said first and second ends of each of said first and second handle members, said first handle member and said second handle member pivotable about a pivot axis defined by said pivot element;
- a first jaw disposed at a first end of said first handle member, said first jaw having a generally U-shaped opening and a first substantially planar surface; and

- a second jaw disposed at a first end of said second handle member in an opposing relation to said first jaw, said second jaw comprising
  - a block of resilient material having a first substantially planar surface, said first surfaces of said first jaw and said block of resilient material being substantially parallel when said first and second jaws are adjacent one another, and
  - a fastener element socket disposed in said first substantially planar surface of said block of resilient material, said fastener element socket having an interior diameter larger than that of said fastener elements disposed in said cover, whereby one of said fastener elements is disposed within said U-shaped opening and said socket when said first and second jaws are brought into gripping contact on opposite sides of said cover.

2. The tool of claim 1 wherein said first and second jaws are integral with the respective ones of said first and second handle members.

3. The tool of claim 1 wherein an interior width defined by said U-shaped opening of said first jaw is larger than a diameter of said fastener elements disposed in said cover.

4. The tool of claim 1 wherein said first jaw is disposed at an angle with respect to said first handle member and wherein said second jaw is disposed at an angle with respect to said second handle member.

5. The tool of claim 1 wherein said socket projects from said second jaw towards said first jaw.

6. The tool of claim 1 wherein said first and second jaws further comprise a resilient covering.

7. The tool of claim 1 wherein a portion of said first and second handle members include a compressible coating.

8. The tool of claim 1 further comprising a biasing member disposed between said first and second handle members.

9. The tool of claim 1 further comprising a locking mechanism for securing said first and second handle members in a fixed position.

10. The tool of claim 1 wherein said pivot element comprises a rivet.

11. A cover installation tool for a cover having a plurality of fastener heads disposed therein, comprising:

- a first handle member having a first end and a second end, said second end including a first jaw having a generally U-shaped plate, said U-shaped plate having an interior width larger than a diameter of said fastener heads disposed in said cover and defining a substantially planar surface;
- a second handle member having a first end and a second end, said second end including a second jaw having a substantially planar plate and a socket projecting therefrom, said socket of said second jaw having an interior diameter larger than said diameter of said fastener heads disposed in said cover, said second handle member disposed at an angle with respect to said first handle member, said first jaw positionable in an opposing relation with said second jaw; and
- a pivot element interconnecting said first handle member and said second handle member, said first handle member and said second handle member pivotable about a pivot axis defined by said pivot element, whereby said substantially planar surface of said first jaw and said substantially planar plate of said second jaw are substantially parallel when said first and second jaws are adjacent one another, and whereby one of said fastener elements is disposable within said generally U-shaped plate and said socket when said first and second jaws are brought into gripping contact on opposite sides of said cover.

12. A cover installation tool for use with a cover having a plurality of fastener heads disposed therein, comprising:

a first handle member having a first end and a second end, said second end including a first jaw having a generally U-shaped plate, said generally U-shaped plate having an interior width larger than a diameter of said fastener heads disposed in said cover and a substantially planar surface;

second handle member having a first end and a second end, said second end including a second jaw having a substantially planar plate and a socket projecting therefrom, said socket of said second jaw having a diameter larger than said diameter of said fastener heads disposed in said cover, said second handle member disposed at an angle with respect to said first handle member, said first jaw positionable in an opposing relation with said second jaw;

a pivot element interconnecting said first handle member and said second handle member, said first handle member and said second handle member being pivotable about a pivot axis defined by, said pivot element; and a locking mechanism for securing said first handle member and said second handle member in a fixed position relative to each other, whereby said substantially planar surface of said first jaw and said substantially planar plate of said second jaw are substantially parallel when said first and second jaws are adjacent one another, and whereby one of said fastener elements is disposable within said generally U-shaped plate and said socket when said first and second jaws are brought into gripping contact on opposite sides of said cover.

13. A method of installing a cover having snap heads suitable for engagement with snap posts mounted on a receiving surface, said method comprising:

providing a tool having a first jaw including a substantially U-shaped plate and a second jaw having a substantially rectangular plate and a socket projecting therefrom;

disposing said first and second jaws on opposing sides of said cover;

engaging a portion of said cover with said first and second jaws, whereby one of said snap heads is disposed within an interior of said U-shaped plate and projecting from within said socket;

manipulating said tool to position said engaged cover portion with respect to a snap post disposed on said receiving surface;

applying force to said tool to engage said snap post with said snap head; and removing said first and second jaws from about said cover portion.

* * * * *

UNITED STATES PATENT AND TRADEMARK OFFICE
CERTIFICATE OF CORRECTION

PATENT NO. : 6,438,817 B1
DATED : August 27, 2002
INVENTOR(S) : Andrew L. Pongratz It is certified that error appears in the above-identified patent and that said Letters Patent is hereby corrected as shown below:

<u>Column 1,</u>
Line 64, "tool-of" should read -- tool of --;

<u>Column 2,</u>
Line 35, "he ad" should read -- head --;

<u>Column 3,</u>
Line 24, "vihicle" should read -- vehicle --; and
Line 38, "is," should read -- is --.

Signed and Sealed this

Twenty-fifth Day of March, 2003

JAMES E. ROGAN
*Director of the United States Patent and Trademark Office*